United States Patent [19]

Toyoda et al.

[11] Patent Number: 4,472,227

[45] Date of Patent: Sep. 18, 1984

[54] PROCESS FOR PRODUCING ORIENTED COMPOSITE POLYOLEFIN RESIN FILMS

[75] Inventors: Takashi Toyoda; Yozo Ohba, both of Omigawa; Kanji Shirai; Akira Takagi, both of Hazaki; Masaaki Yamanaka, Omigawa, all of Japan

[73] Assignee: Oji Yuka Goseishi Kabushiki Kaisha

[21] Appl. No.: 374,648

[22] Filed: May 4, 1982

[30] Foreign Application Priority Data

May 6, 1981 [JP] Japan .................................. 56-67842

[51] Int. Cl.³ .............................................. B29D 7/02
[52] U.S. Cl. ........................... 156/244.11; 156/244.24
[58] Field of Search ............. 156/243, 244.11, 244.24; 428/516

[56] References Cited

U.S. PATENT DOCUMENTS

| | | | |
|---|---|---|---|
| 3,737,354 | 6/1973 | Hattori | 156/244.24 |
| 3,741,841 | 6/1973 | Toyoda et al. | 156/229 |
| 3,790,435 | 2/1974 | Tanba et al. | 156/244.24 |
| 3,841,943 | 10/1974 | Takashi et al. | 156/244.24 |
| 3,871,947 | 3/1975 | Brekken | 156/244.24 |
| 4,086,317 | 4/1978 | Miyabe | 156/244.24 |
| 4,086,383 | 4/1978 | Yamano et al. | 428/516 |
| 4,318,950 | 3/1982 | Takashi et al. | 428/143 |

*Primary Examiner*—Caleb Weston
*Attorney, Agent, or Firm*—Robert E. Burns; Emmanuel J. Lobato; Bruce L. Adams

[57] ABSTRACT

A process for producing an oriented composite polyolefin resin film which comprises melt-laminating a polyolefin resin sheet for a paper-like layer on at least one surface of a monoaxially stretched polyolefin resin sheet for a substrate layer, and then stretching the resulting laminated sheet in a direction perpendicular to said monoaxially stretched direction. The polyolefin resin sheet for the substrate layer is a sheet of composite structure prepared by melt-extruding the specific compositions (A), (B), and (C) through a co-extrusion die in such a manner that a layer composed of the thermoplastic resin composition (A) is laminated on one surface of an intermediate layer composed of the polyolefin composition (B) containing a filler and a layer composed of the thermoplastic resin composition (C) is laminated on the other surface of the intermediate layer. Said polyolefin resin sheet for the paper-like layer is composed of a specific polyolefin composition (D) containing a filler.

10 Claims, No Drawings

PROCESS FOR PRODUCING ORIENTED COMPOSITE POLYOLEFIN RESIN FILMS

BACKGROUND OF THE INVENTION

This invention relates to a process for producing an oriented composite polyolefin resin film. More specifically, it relates to a process for production with good molding characteristics of an oriented composite polyolefin resin film having good dimensional stability and appearance.

An opaque film is obtained by monoaxially or biaxially stretching or orienting at a suitable temperature a film of a thermoplastic resin in which an inorganic fine powder (hereinafter sometimes referred to as a filler) has been mixed. The resulting film is similar to pulp paper with respect to its opaqueness, whiteness, appearance and texture. It has been known that such a film can be used for a variety of uses of the conventional pulp paper, in the form of a sheet of monolayer structure consisting of the film, or a sheet of multilayer structure having the film as a surface layer.

The opaqueness and whiteness of the oriented thermoplastic resin film containing fillers is due to the fact that light is scattered on the surface and in the inside of the film. More specifically, this scattering of light is due to the facts that peeling between the resin and the filler particles takes place upon stretching the film to form minute interstices between the resin and the filler particles as the stretching proceeds, and minute voids containing therein the filler particles are formed in the interior of the film when the stretching is terminated, and also that minute cracks are produced on the surface because the formation of voids of a closed structure is not maintained in the vicinity of the film surface. Accordingly, the film is provided with the properties similar to pulp paper due to the presence of the above-mentioned surface cracks and interior voids.

However, when such an opaque film is subjected to a fabrication operation such as printing, folding, bookbinding and bag making, the closed structures of the voids in the vicinity of the film surface is destroyed by the surface cracks. As a result, the filler particles which have been present on the film surface in a liberated or semi-liberated state are deposited onto the rollers, blankets or the like of the fabricating machine, which often results in trouble in the processing and markedly lowers the fabrication efficiency (hereinafter sometimes referred to as paper dust trouble).

Thus, in an opaque film having such a structure, it can be said that it is preferably that the surface layer have a low content of the filler as long as the film is printable or writable and also has paper-like opaqueness.

A film which satisfies such requirements is exemplified by a film of laminate structure which has been produced by laminating a layer having a relatively low content of a filler (paper-like layer) on the surface of a layer having a high content of a filler (substrate layer) (as disclosed in Japanese Patent Publication No. 42628/1976). In this known oriented film of laminate structure, however, both the paper-like layer and the substrate layer are biaxially oriented films. There are some problems in this film in that the surface has a pearl-like luster and also interlayer peeling between the two layers is apt to occur due to the fact that the paper-like layer is a biaxially oriented film. Moreover, the paper-like layer is not practicable for offset printing, although it may be practically used for gravure printing.

Such problems may be solved by the use of a laminate structure sheet in which the paper-like layer is a monoaxially stretched film and the substrate layer is a biaxially oriented film. According to our study, however, such a laminate structure sheet, which has been produced by using as the substrate layer a polyolefin resin having a melt index (MI) of 0.5 to 3 to provide the substrate layer with sufficient mechanical strength and stretching property and also employing a filler content of 20 to 68% to provide sufficient opaqueness, has been found to still have several problems. More specifically, the laminate structure sheet is produced by preparing a polyolefin resin sheet stretched in the machine operational direction for the substrate layer, melt-laminating a polyolefin resin for the paper-like layer on at least one surface of the stretched sheet, and then stretching the resulting laminated sheet in the cross-machine or transverse direction. However, because the substrate layer is a polyolefin resin having a low MI and a high filler content, the following defects are observed.

(1) A burned degraded resin is deposited and accumulated on the slit of a die for extruding the substrate sheet and produces streaks on the surface of an extruded sheet. As a result, the stretching cannot be conducted uniformly, and streaks of uneven opaqueness are observed when the resulting oriented composite film when light is passed therethrough.

(2) When the melt-extruded substrate sheet is cooled, shrinkage takes place around the nuclei of the filler particles to form a number of depressions on the sheet surface. As a result, a number of unstretched portions as large as rice grains are seen in the resulting oriented composite film (i.e., so-called "dimples").

(3) It is difficult to stretch a polyolefin resin sheet having a low MI and a high filler content. Thus, in addition to the above-mentioned formation of the depressions, nonuniform stretching is apt to take place.

SUMMARY OF THE INVENTION

An object of the present invention is to solve the above described problems in the production of oriented composite polyolefin resin films. This object is accomplished by the use of a specific sheet of composite structure produced by co-extrusion as the sheet for the substrate layer.

In accordance with the present invention, there is provided a process for producing an oriented composite polyolefin resin film, which comprises melt-laminating a polyolefin resin sheet for a paper-like layer on at least one surface of a polyolefin resin sheet monoaxially stretched in one direction for a substrate layer, and then stretching the resulting laminated sheet in a direction perpendicular to said monoaxially stretched direction, said polyolefin resin sheet for the substrate layer being a sheet of composite structure prepared by melt-extruding the under-defined compositions (A), (B), and (C) through a co-extrusion die in such a manner that a layer composed of the composition (A) is laminated on one surface of an intermediate layer composed of the composition (B), and a layer composed of the composition (C) is laminated on the other surface of the intermediate layer, said polyolefin resin sheet for the paper-like layer being composed of the under-defined composition (D), wherein: composition (A) is a thermoplastic resin composition containing a fine inorganic powder in a proportion of 0 to 18% by weight; composition (B) is a polyolefin resin composition containing a fine inorganic powder in a proportion of 20 to 68% by weight, wherein the melt index of the polyolefin resin is 0.5 to 3 g/10 minutes; composition (C) is a thermoplastic resin composition containing a fine inorganic powder in a proportion of 0 to 18% by weight; and composition (D) is a polyolefin resin composition containing a fine inorganic powder in a proportion of 5 to 50% by weight, wherein the melt index of the polyolefin resin is 3 to 12 g/10 minutes and is greater than the MI of the polyolefin resin used in the composition (B).

In accordance with the present invention, the above-described problems have been solved successfully by covering a polyolefin resin sheet having a low MI and a high filler content with resin layers containing no filler or a low content of filler and then melt-extruding the resulting composite sheet through a co-extrusion die to produce a sheet for the substrate layer.

Although the co-extrusion die is complicated in structure in comparison with a single extrusion die, it has been widely used industrially. the techniques of the co-extrusion are not essentially different from those of the single extrusion. Thus, the above described prior art problems have been solved completely according to the present invention.

DETAILED DESCRIPTION OF THE INVENTION

1. Substrate layer

The polyolefin resin sheet for the substrate layer to be used in the present invention is a composite sheet composed of the layers of the compositions (A), (B) and (C), which has been prepared by co-extrusion and also stretched monoaxially.

(1) Compositions (A) and (C)

Examples of the thermoplastic resins constituting the compositions (A) and (C) are polyolefin resins such as polyethylene, polypropylene, ethylene-propylene copolymer, poly(4-methylpentene-1) and ethylene-vinyl acetate copolymer; polystyrene; polyamide; polyethylene terephthalate; a partial hydrolyzate of ethylene-vinyl acetate copolymer; ethylene-acrylic acid copolymer and salts thereof; vinylidene chloride copolymers such as vinyl chloride-vinylidene chloride copolymer, and the like; and mixtures thereof, polypropylene being the most preferable.

Of these resins, the use of a polyolefin resin such as polyethylene, polypropylene or ethylene-vinyl acetate copolymer in at least one and desirably both of the compositions (A) and (C) is preferable from the viewpoint of lower cost and enhanced adhesiveness with the layers composed of the composition (B) and the composition (D). Polyolefin resins having different olefin components, MI, and other features can be used even when the polyolefin resins are used in both the compositions (A) and (C).

The substrate layer formed from the composition (B) in accordance with the present invention has therein a multiplicity of minute voids and has high permeability with respect to a gas such as humidity and oxygen. Thus, in the case where a gas-barrier property is needed in the oriented composite film of the present invention, it is preferred to use in at least one of the compositions (A) and (C) a thermoplastic resin selected from polyethylene terephthalate, polyamide, a partial hydrolyzate of ethylene-vinyl acetate copolymer, and a vinylidene chloride copolymer (e.g., a copolymer with vinyl chloride).

Because the layers composed of the compositions (A) and (C) are used to prevent the formation of a burned resin when the compositions (A), (B) and (C) are extruded through a co-extrusion die in such a manner that the compositions (A) and (C) cover both sides of an intermediate layer composed of the composition (B) having a low MI and a high content of fillers, the resins used for the compositions (A) and (C) should have an MI equivalent to or greater than the MI of the polyolefin resin for the composition (B). A preferable MI is in the range of about 1 to about 3. The compositions (A) and (C) should contain no filler or contain a filler in a quantity of up to 18% and preferably up to 15% by weight. Moreover, because the layer(s) composed of the composition (D) is to be laminated on the layer(s) composed of the composition (A) or/and (C), the compositions (A) and (C) preferably contain 3% or more of a filler from the viewpoint of their adhesiveness with respect to the composition (D) layer.

With respect to the filler, reference is made to the following description of the composition (B).

The compositions (A) and (C) are thermoplastic resin compositions and thus can contain a variety of auxiliary materials which the conventional composition of this type may contain. For the details, reference is made to the corresponding description given below.

(2) Composition (B)

As the polyolefin resin constituting the composition (B), use can be made of the same resin, except for the condition of the MI value, as the polyolefin resins mentioned above with respect to the compositions (A) and (C), or a resin different from these polyolefin resins. The layer composed of the composition (B) is used as a substrate layer essentially to control the mechanical properties of the resulting oriented composite film product. Thus, in view of the stiffness of the film, for the polyolefin resin for the composition (B) high-density polyethylene, polypropylene, and mixtures thereof and preferred, polypropylene being the most preferable.

The polyolefin resin for the composition (B) should have an MI of 0.5 to 3, preferably 1 to 3. A resin having an MI of less than 0.5 may have higher resistance to creep but lowers productivity because of a smaller extrusion rate. On the other hand, a polypropylene resin for the substrate layer having an MI of more than 3 is apt to result in uneven stretching when the substrate layer is thick. In this connection, it is desirable that the MI of the polyolefin resin for the composition (B) be lower by 1 or more than the MI of the polyolefin resin for the composition (D) (detailed below) from the viewpoint of the stretching property in the cross-machine or tranverse direction (also detailed below).

The composition (B) contains a filler in a quantity of 20 to 68%, preferably 25 to 65%, by weight. When the quantity of the filler is less than 20%, it is necessary to add a large quantity of the filler to the surface layer composition (D) for imparting a paper-like feel to the resulting oriented composite film. Thus, effects such as prevention of paper dust trouble and of decrease in surface strength of the resulting oriented composite film and prevention of deposition of burned resin on the extrusion die for the surface layer film cannot be expected. On the other hand, when the quantity of the filler is over 68% by weight, extrusion molding becomes difficult.

When, in the compositions (A) and/or (C), the afore mentioned resins having low gas-permeability are used as the thermoplastic resin, it is preferable that the composition (B) contain a maleic anhydride-modified polyolefin (detailed below) in a ratio of 0.05 to 5% by weight of the resin components for enhancing the adhesiveness between the layer composed of the composition (B) and the layer(s) composed of the composition(s) (A) or/and (C).

The fine inorganic powder to be used as the filler can be any one usable as a filler for resins, examples of which are calcium carbonate, calcined clay, diatomaceous earth, titanium oxide, barium sulfate, aluminum sulfate, and silica. The particle size of the filler is preferably in the range of 0.05 to 10 microns, espcially 0.1 to 5 microns. As the filler for the composition (B), calcium carbonate which is cheaper than other fillers is preferred.

(3) Production

The production of a sheet of multilayer structure by melting and extruding the compositions (A), (B) and (C) through a co-extrusion die can be carried out by any means which can be used for the co-extrusion of three resins. For example, the compositions (A), (B) and (C) are melted and kneaded separately in three extruders, respectively (of course, two extruders may be used when the compositions (A) and (C) are the same). The molten compositions are introduced via conduit tubes into a co-extrusion die, melt-laminated in the co-extrusion die in such a manner that the composition (B) will be an intermediate layer and the layers composed of the compositions (A) and (C) come on the opposite outer sides of the intermediate layer, and the laminated structure is extruded through the slit of the co-extrusion die into a sheeting, which step is followed by cooling to a temperature of 60° C. or lower. The resulting sheeting is heated to a temperature suitable for stretching (i.e., a temperature lower than the melting point of the polyolefin resin constituting the composition (B) but a temperature at which stretching can be conducted and then is stretched 2.5 to 10 times, preferably 4 to 8 times, in the machine operational direction by utilizing the difference in the circumferential velocities of take-up rollers.

The structure in the thickness direction of the substrate layer is preferably in such a range that the ratio of the thicknesses of the layers (A):(B):(C) composed of the compositions (A), (B), and (C), respectively, be approximately (0.005 to 0.5):1:(0.005 to 0.5).

(4) Modification, etc.

All of the compositions (A), (B), and (C) are thermoplastic resin compositions. Thus, these compositions can contain a variety of auxiliary materials which the compositions of this type may contain such as antioxidants, antistatic agents, surface active agents, lubricants, ultraviolet-ray absorbing agents and the like in a ratio of about 0.01 to 2% by weight, respectively. Especially, exudative additives such as surface active agents and ultraviolet-ray absorbing agents can be incorporated not only in the composition (D) for the surface layer (detailed below) but also in the composition (B) for the substrate layer to maintain the effectiveness thereof for a longer period of time.

2. Surface layer

The surface layer of the film of the present invention is formed by the composition (D).

As the polyolefin resin constituting the composition (D), the same resin, except for the condition of the MI value, as the polyolefin resins mentioned above with respect to the compositions (A) and (C), or a resin different from these polyolefin resins can be used. Since the layer composed of the composition (D) is to constitute the surface of the oriented composite film product, the polyolefin resin to be used is preferably selected from high-density polyethylene, polypropylene, and mixtures thereof, in view of the stiffness of the film, polypropylene being the most preferable.

The polyolefin resin for the composition (D) should have an MI of 3 to 12, preferably 4 to 8. As mentioned above, it is desirable that the MI of the polyolefin resin be higher by 1 or more than the MI of the polyolefin resin used for the composition (B). Polypropylene of the MI higher by at least 2 than that of polypropylene of the composition (B) is the most preferable for the composition (D).

Because the composition (D) constitutes the surface layer of the oriented composite film product, it contains a filler sufficient to exhibit desirable writing and/or printing properties. The filler content should be at a relatively low level so that the aforementioned paper dust trouble will not take place. Specifically, the filler content is in a range of 5 to 50%, preferably 5 to less than 20% by weight. The ratio of the filler content in the composition (D) to that in the composition (B) is preferably in a range of about ½ to about ⅕. The above mentioned ratio is selected, because paper dust trouble which is apt to occur in the paper-like layer of the oriented composite film can be controlled with such a ratio of filler contents, even when a maleic anhydride-modified polyolefin is not admixed into the composition (D).

As the fine inorganic powder to be used as the filler, the same filler as or a different filler from those described above for the composition (B) can be used.

The composition (D) to constitute the surface layer of the oriented composite film product preferably contains a polyolefin onto which maleic anhydride has been graft-copolymerized (hereinafter referred to as a modified polyolefin) for accomplishing the object of preventing paper dust trouble more fully. For the modified polyolefin it is preferable to use a polyolefin (preferably high-density polyethylene, polypropylene and mixtures thereof) onto which maleic anhydride has been graft-copolymerized in a ratio of 0.01 to 5% by weight (of the polyolefin). It is also preferable that the composition (D) contain such a modified polyolefin in a ratio of 0.1 to 15% by weight of the composition. Moreover, when the composition (A) and (or) the composition (C) comprise the aforementioned resin having low gas-permeability, it is preferable that the composition (D) contain such a modified polyolefin from the viewpoint of enhancing the adhesiveness between these layers.

The method for producing the surface layer can be said to be substantially the same as that of the oriented composite film. Reference is made to the following description.

3. Production of the oriented composite film

The sheet composed of the composition (D) is melt-extruded and laminated on at least one surface and preferably on the both surfaces of the monoaxially stretched multilayer sheet for the substrate layer obtained as described above, and the laminated sheet is then cooled to a temperature of 80° C. or lower. The resulting laminated sheet is reheated to a temperature suitable for stretching (i.e., a temperature lower than the melting point of the polyolefin resin constituting the composition (B) but a temperature at which the stretching can be conducted), is stretched 2.5 to 12 times, preferably 4 to 10 times, in the cross-machine or transverse direction by means of a cross-stretching machine such as a tenter, and then is heat-set and cooled. Then trimming of the edges is carried out. An oriented composite film is thus obtained.

The preferable temperature range for stretching can be suitably selected with respect to the given resin components. More specifically, when the polyolefin resin for the compositions (B) and (D) is, for example, homopolypropylene (having a melting point of 164° C. to 167° C.) the temperature range is 150° C. to 162° C.; when the polyolefin resin is high-density polyethylene, the temperature range is 110° to 120° C.

Specifically, the temperature for the heat-setting is 148° to 160° C., preferably 152° to 156° C., when the polyolefin resin for the compositions (B) and (D) is, for example, homopolypropylene; this temperature is 108° to 116° C., preferably 114° to 116° C., when the polyolefin resin is, for example, high-density polyethylene. The heat setting is normally conducted for 5 to 30 seconds.

In the case where the surface layer to be composed of the composition (D) is too thin, and therefore the extrusion molding thereof the stretching of the resulting laminate sheet are expected to be difficult, it is preferable to co-extrude together with the surface layer a polyolefin resin containing no filler or a low content of filler between the surface layer and the substrate layer, instead of extruding the composition (D) alone, to melt-laminate them on the substrate layer.

4. Oriented composite film products

The oriented composite film prepared in accordance with the present invention has therein a large number of minute voids because the layer composed of the composition (B) in the substrate layer has a high content of the filler. Thus the composite film is provided with a paper-like feel. Moreover, the surface layer containing a relatively small amount of the filler has a paper-like feel and also has a good absorption property for an offset printing ink due to surface cracks around the filler particles in the surface layer. The surface layer also has therein minute voids.

In this connection, the number of the minute voids can be expressed, according to the following formula, as percent void of 1 to 40%, preferably 3 to 15%, in the case of the surface layer, and as percent void of 20 to 80%, preferably 25 to 60%, in the case of the intermediate layer composed of the composition (B) in the substrate layer;

$$\text{Percent void (\%)} = \frac{\rho_o - \rho}{\rho_o} \times 100$$

wherein:
$\rho_o$ is the apparent density of the unstretched film, and
$\rho$ is the apparent density of the stretched film.

The thickness of each layer in the oriented composite film can be optionally selected. The preferred thicknesses and the proportion of the thicknesses are as follows:

(a) the thickness of the surface layers is 3 microns or more, and the proportion of thickness of the surface layer in the composite film is ¼ or less per each surface layer;

(b) the thickness of the layers composed of the compositions (A) and (C) is 3 to 40 microns, preferably 5 to 25 microns, respectively; and (c) the thickness of the intermediate layer composed of the composition (B) is 20 to 250 microns, and the proportion of thickness thereof in the composite film is ⅜ or more, preferably ½ or more.

5. Examples of Experiments

EXAMPLE 1

Compositions (A) and (C)

(1) polypropylene, manufactured by Mitsubishi Yuka K.K., Japan "Mitsubishi Noblen MA-6" (trade name) [MI=1.2 g/10 minutes (measured at 230° C.)]: 85% by wt.

(2) high-density polyethylene, mfd. by Mitsubishi Yuka K.K., Japan "Yukalon Hard EY-40" (trade name): 5% by wt.

(3) calicum carbonate fine powder "KS-1500", mfd. by Kanehira Kogyo K. K. , Japan (average particle size 1.2 microns): 10% by wt.

Composition (B)

(1) polypropylene "Mitsubishi Noblen MA-6": 50% by wt.

(2) high-density polyethylene "Yukalon Hard EY-40": 10% by wt.

(3) calcium carbonate "KS-1500": 40% by wt.

Composition (D)

(1) polypropylene, mfd. by Mitsubishi Yuka K.K., Japan "Mitsubishi Noblen MA-3" (trade name) [MI=6 g/10 minutes (measured at 230° C.)]: 80% by wt.

(2) high-density polyethylene "Yukalon Hard EY-40": 5% by wt.

(3) calcium carbonate: 15% by wt.

The above listed compositions (A), (B) and (C) were melted and kneaded in separate extruders, respectively, and supplied to a co-extrusion die. The molten compositions were melt-laminated in the die in such a manner that the composition (B) became an intermediate layer, and the compositions (A) and (C) were disposed on the opposite outer sides of the intermediate layer. The laminated structure was then extruded at a temperature of about 250° C. into a 3-layer sheet, which was cooled to about 50° C.

The resulting sheet was heated to about 140° C. and then stretched 5 times in the machine operational direction by utilizing the difference in the circumferential velocities of rollers to obtain a monoaxially stretched sheet of the 3-layer structure (for a substrate layer). Separately, the composition (D) was melted and kneaded in two extruders and extruded from dies into sheets at a temperature of 250° C. to laminate them onto the opposite surfaces of the above described substrate layer. The laminated sheet was once cooled to a temperature higher by about 30° C. than room temperature, reheated to about 150° C., stretched about 9 times in the cross-machine direction by means of a tenter, and further heat-set by passing it through an oven heated at 160° C., after which the edges were slit. Thus there was obtained a white opaque synthetic paper of 5-layer structure.

The thickness (in micron) of each layer in the synthetic paper was as follows:

(D)/(A)/(B)/(C)/(D)=25/5/50/5/25.

EXAMPLES 2 THROUGH 9 AND COMPARISON EXAMPLES 1 THROUGH 3

Synthetic paper sheets of 5-layer structure were prepared substantially in the same way as in Example 1 except that the formulations of the compositions (A) through (D) were changed as shown in Table 1.

Each of the resulting synthetic paper sheets was evaluated with respect to the properties as synthetic paper in accordance with the following methods and standards. The results are shown in Table 1.

(1) Presence or absence of streaks

The presence or absence of streaks was judged by observation of the synthetic paper when fluorescent light was passed therethrough. The results are indicated by the following designations.

o: no streak was seen.

Δ: some streaks were observed, but practically negligible for use.

x: distinct streaks were observed, not suitable for practical use.

(2) Surface strength

A piece of an adhesive tape manufactured by Nichiban K.K., Japan "Cellotape" (trade name) (12 mm wide×7 cm long) was caused to adhere to a piece of the synthetic paper of 5-cm length and was lightly rubbed 3 times with the finger-tip, and then the tape was peeled off. The results were recorded according to the following designations.

o: the synthetic paper was not delaminated together with the tape.

Δ: the synthetic paper was partly delaminated together with the tape.

x: a large portion of the synthetic paper was delaminated and torn off from the surface or intermediate layer thereof.

(3) Presence or absence of depression

The number of the depressions as large as rice grains present on the synthetic paper was recorded according to the following designations.

o: no depression.

Δ: 1 to 4 depressions per 10 m² of the paper.

x: 5 or more of depressions per 10 m².

(4) Paper-like feel

The feel was evaluated according to the following designations.

o: the paper had sufficient whiteness and opaqueness as printing paper, and the surface thereof was matte-finished.

Δ: the paper had rather poor opaqueness as printing paper and the surface thereof was too smooth.

(5) Writing properties

When characters were written with a pencil HB supplied from Mitsubishi Enpitsu K.K., Japan, the shade of the pencil lead on the synthetic paper was evaluated according to the following designations.

o: written satisfactorily.

Δ: rather poor shade of the pencil lead.

x: the shade of the pencil lead was not satisfactory for practical use.

TABLE 1

| Run No. | Compositions A and C | | Composition B | | Composition D | | Streaks | Depression | Paper-like feel | Writing property | Surface strength |
|---|---|---|---|---|---|---|---|---|---|---|---|
| Ex. 1 | MA-6 | 85 | MA-6 | 50 | MA-3 | 60 | o | o | o | o | o |
| | EY-40 | 5 | EY-40 | 10 | EY-40 | 3 | | | | | |
| | KS-1500 | 10 | KS-1500 | 40 | KS-1500 | 35 | | | | | |
| 2 | MA-6 | 95 | MA-6 | 50 | MA-3 | 60 | o | o | o | o | Δ |
| | EY-40 | 5 | EY-40 | 10 | EY-40 | 3 | | | | | |
| | KS-1500 | 0 | KS-1500 | 40 | KS-1500 | 35 | | | | | |
| 3 | MA-6 | 92 | MA-6 | 50 | MA-3 | 60 | o | o | o | o | o |
| | EY-40 | 5 | EY-40 | 10 | EY-40 | 3 | | | | | |
| | KS-1500 | 3 | KS-1500 | 40 | KS-1500 | 35 | | | | | |
| 4 | MA-6 | 82 | MA-6 | 50 | MA-3 | 60 | o | o | o | o | o |
| | EY-40 | 3 | EY-40 | 10 | EY-40 | 3 | | | | | |
| | KS-1500 | 15 | KS-1500 | 40 | KS-1500 | 35 | | | | | |
| 5 | MA-6 | 79 | MA-6 | 50 | MA-3 | 60 | Δ | o | o | o | Δ |
| | EY-40 | 3 | EY-40 | 10 | EY-40 | 3 | | | | | |
| | KS-1500 | 18 | KS-1500 | 40 | KS-1500 | 35 | | | | | |
| Comp. Ex. 1 | MA-6 | 72 | MA-6 | 50 | MA-3 | 60 | x | Δ | o | o | x |
| | EY-40 | 3 | EY-40 | 10 | EY-40 | 3 | | | | | |
| | KS-1500 | 25 | KS-1500 | 40 | KS-1500 | 35 | | | | | |
| 2 | MA-6 | 85 | MA-6 | 22 | MA-3 | 60 | o | o | o | o | x |
| | EY-40 | 5 | EY-40 | 10 | EY-40 | 3 | | | | | |
| | KS-1500 | 10 | KS-1500 | 68 | KS-1500 | 35 | | | | | |
| Ex. 6 | MA-6 | 85 | MA-6 | 25 | MA-3 | 60 | o | o | o | o | o |
| | EY-40 | 5 | EY-40 | 10 | EY-40 | 3 | | | | | |
| | KS-1500 | 10 | KS-1500 | 65 | KS-1500 | 35 | | | | | |
| 7 | MA-6 | 85 | MA-6 | 75 | MA-3 | 60 | o | o | Δ | o | o |
| | EY-40 | 5 | EY-40 | 10 | EY-40 | 3 | | | | | |
| | KS-1500 | 10 | KS-1500 | 15 | KS-1500 | 35 | | | | | |
| 8 | MA-6 | 85 | MA-6 | 50 | MA-3 | 92 | o | o | Δ | Δ | o |
| | EY-40 | 5 | EY-40 | 10 | EY-40 | 3 | | | | | |
| | KS-1500 | 10 | KS-1500 | 40 | KS-1500 | 5 | | | | | |
| 9 | MA-6 | 85 | MA-6 | 50 | MA-3 | 52 | o | o | o | o | o |
| | EY-40 | 5 | EY-40 | 10 | EY-40 | 3 | | | | | |
| | KS-1500 | 10 | KS-1500 | 40 | KS-1500 | 45 | | | | | |
| Comp. Ex. 3 | MA-6 | 85 | MA-6 | 50 | MA-3 | 42 | o | o | o | o | x |
| | EY-40 | 5 | EY-40 | 10 | EY-40 | 3 | | | | | |
| | KS-1500 | 10 | KS-1500 | 40 | KS-1500 | 55 | | | | | |

EXAMPLE 10

A synthetic paper sheet of 5-layer structure was prepared substantially in the same way as in Example 1 except that the following composition (D') was used instead of the composition (D).

Composition (D')

(1) a polypropylene "Mitsubishi Noblen MA-3": 62% by wt.
(2) a modified polypropylene wherein maleic anhydride was graft-copolymerized onto the polypropylene in a proportion of 0.65% by weight: 5% by wt.
(3) a high-density polyethylene "EY-40": 3% by wt.
(4) fine calcium carbonate powder "KS-1500": 35% by wt.

The resulting synthetic paper had neither streaks nor depressions and had excellent paper-like feel as well as good writing and offset printing properties.

What is claimed is:

1. A process for producing an oriented composite polyolefin resin film, which comprises melt-laminating a polyolefin resin sheet having fine inorganic powder dispersed therein as a paper-like layer on at least one surface of a polyolefin resin sheet monoaxially stretched in one direction as a substrate layer, and then stretching the resulting laminated sheet in a direction perpendicular to said monoaxially stretched direction thereby to generate surface cracks and minute voids on the surface and within the body of the surface layer, said polyolefin resin sheet for the substrate layer being a sheet of composite structure prepared by melt-extruding the under-defined compositions (A), (B), and (C) through a co-extrusion die in such a manner that a layer composed of the composition (A) is laminated on one surface of an intermediate layer composed of the composition (B), and a layer composed of the composition (C) is laminated on the other surface of the intermediate layer, whereby the intermediate layer composed of the composition (B) is extruded from the die with both the surfaces thereof covered with the layers composed of the compositions (A) and (C), respectively, the ratio of the thickness of the three layers composed respectively of the compositions (A), (B) and (C) after the step of stretching being about 0.005 to 0.5:1:0.005 to 0.5, said polyolefin resin sheet for the paper-like layer being composed of the under-defined composition (D), wherein:

composition (A) is a thermoplastic resin composition containing a fine inorganic powder in a proportion of 0 to 18% by weight;
composition (B) is a polyolefin resin composition containing a fine inorganic powder in a proportion of 20 to 68% by weight, wherein the melt index of the polyolefin resin is 0.5 to 3 g/10 minutes;
composition (C) is a thermoplastic resin composition containing a fine inorganic powder in a proportion of 0 to 18% by weight; and
composition (D) is a polyolefin resin composition containing a fine inorganic powder in a proportion of 5 to 50% by weight, wherein the melt index of the polyolefin resin is 3 to 12 g/10 minutes and is greater than the MI of the polyolefin resin used in the composition (B).

2. The process according to claim 1, in which each of the thermoplastic resins of the composition (A) and the composition (C) is a polyolefin resin.

3. The process according to claim 1, in which at least one of the thermoplastic resins of the compositions (A) and (C) is a resin selected from the group consisting of polyamides, polyethylene terephthalates, partial hydrolyzates of ethylene-vinyl acetate copolymers, and vinylidene chloride copolymers.

4. The process according to any of claims 1 through 3, in which the composition (D) contains a modified polypropylene wherein 0.01 to 5% by weight of maleic anhydride is copolymerized with polypropylene, in a proportion of 0.1 to 15% by weight of the composition (D).

5. The process according to any of claims 1 through 3, in which the composition (B) has a formulation comprising 20 to 68% of calcium carbonate, 27 to 79.95% of polypropylene, and 0.05 to 5% of a modified polypropylene wherein maleic anhydride has been graft-copolymerized onto the polypropylene in a proportion of 0.01 to 5%, all percentages being by weight.

6. The process according to claim 1 in which the resins or the polyolefins of the compositions (A) through (D) are polypropylene.

7. The process according to claim 6 in which the melt index of the polyolefin of the composition (D) is greater by at least 2 than that of the polyolefin of the composition (B).

8. The process according to claim 1 in which the resins used for compositions (A) and (C) have a melt index equal to or greater than the melt index of the polyolefin resin of composition (B).

9. The process according to claim 1 in which the proportion of fine inorganic powder in composition (B) is 25 to 65% by weight.

10. A process for producing an oriented composite resin film which comprises:

preparing a substrate sheet by melt extruding compositions (A), (B) and (C) through a co-extrusion die in such a manner as to yield a polyolefin resin sheet of composite structure having an intermediate layer composed of composition (B) a layer of composition (A) laminated on one surface of the intermediate layer and a layer of composition (C) laminated on the intermediate layer and whereby the intermediate layer composed of the composition (B) is extruded from the die with both the surfaces thereof covered with the layers composed of the compositions (A) and (C), respectively, and monoaxially stretching the substrate sheet, the ratio of the thickness of the three layers composed respectively of the compositions (A), (B) and (C) after the step of stretching being about 0.005 to 0.5:1:0.005 to 0.5, melt-laminating a polyolefin resin sheet having fine inorganic powder dispersed therein as a paper-like layer on at least one surface of said substrate sheet and then stretching the resulting laminated sheet in a direction perpendicular to said monoaxially stretched direction thereby to generate surface cracks and minute voids on the surface and within the body of the paper-like surface layer, wherein:

composition (A) is a thermoplastic resin composition containing a fine inoganic powder in a proportion of 0 to 18% by weight;
composition (B) is a polyolefin resin composition containing a fine inorganic powder in a proportion of 20 to 68% by weight, wherein the melt index of the polyolefin resin is 0.5 to 3 g/10 minutes;

composition (C) is a thermoplastic resin composition containing a fine inorganic powder in a proportion of 0 to 18% by weight; and composition (D) is a polyolefin resin composition containing a fine inorganic powder in a proportion of 5 to 50% by weight wherein the melt index of the polyolefin resin is 3 to 12 g/10 minutes and is greater than the MI of the polyolefin resin used in the composition (B).

* * * * *